A. BARRACLOUGH.
SCALE FOR AUTOMATICALLY WEIGHING GRANULAR OR LIKE SUBSTANCES.
APPLICATION FILED AUG. 26, 1918.

1,374,977.

Patented Apr. 19, 1921.
2 SHEETS—SHEET 1.

INVENTOR:
ARTHUR BARRACLOUGH
BY: Ivan Oldenzeel
ATTORNEY

UNITED STATES PATENT OFFICE.

ARTHUR BARRACLOUGH, OF BIRMINGHAM, ENGLAND, ASSIGNOR TO W. & T. AVERY LIMITED, OF BIRMINGHAM, ENGLAND.

SCALE FOR AUTOMATICALLY WEIGHING GRANULAR OR LIKE SUBSTANCES.

1,374,977.   Specification of Letters Patent.   Patented Apr. 19, 1921.

Application filed August 26, 1918. Serial No. 251,555.

*To all whom it may concern:*

Be it known that I, ARTHUR BARRACLOUGH, subject of the King of Great Britain, residing at Soho Foundry, Birmingham, England, have invented new and useful Improvements in Scales for Automatically Weighing Granular or like Substances, of which the following is a specification.

This invention has reference to improvements in and connected with scales for automatically weighing granular or like substances, and has for its object to simplify and improve the mechanism now employed whereby the head or bulk of grain or the like in the supply hopper controls the operation of the scale to insure that only when there is a sufficient supply of grain in the supply hopper to complete a determined weighment, is the mechanism of the scale free for its operations, and that when the supply falls below the predetermined minimum the scale mechanism is locked and the weighing operation is automatically suspended, the operation automatically recommencing when the granular or like supply has been sufficiently increased. Automatic scales having in combination mechanism for achieving the said object have hitherto been employed by me. The present invention consists in the combination with automatic weighing scales of the kind herein referred to of means whereby the amount of material in the supply hopper controls through interposed mechanism the operation of the weigh hopper discharge door in such a manner that when the supply falls below a predetermined minimum the weigh hopper discharge door is maintained in the open position and the normal operations of the scale are suspended until the supply of grain has been increased when the operations of the scale are automatically restarted. Various means of carrying this invention into practice may be employed, conditional upon the mechanism within the supply hopper acted upon by the grain and the movement of said mechanism being operatively connected with that of the weigh hopper door or with the mechanism or linkage of the said door, and the invention will now be described with reference to the accompanying drawings in which similar reference numerals indicate similar parts in the two views.

Figure 1:
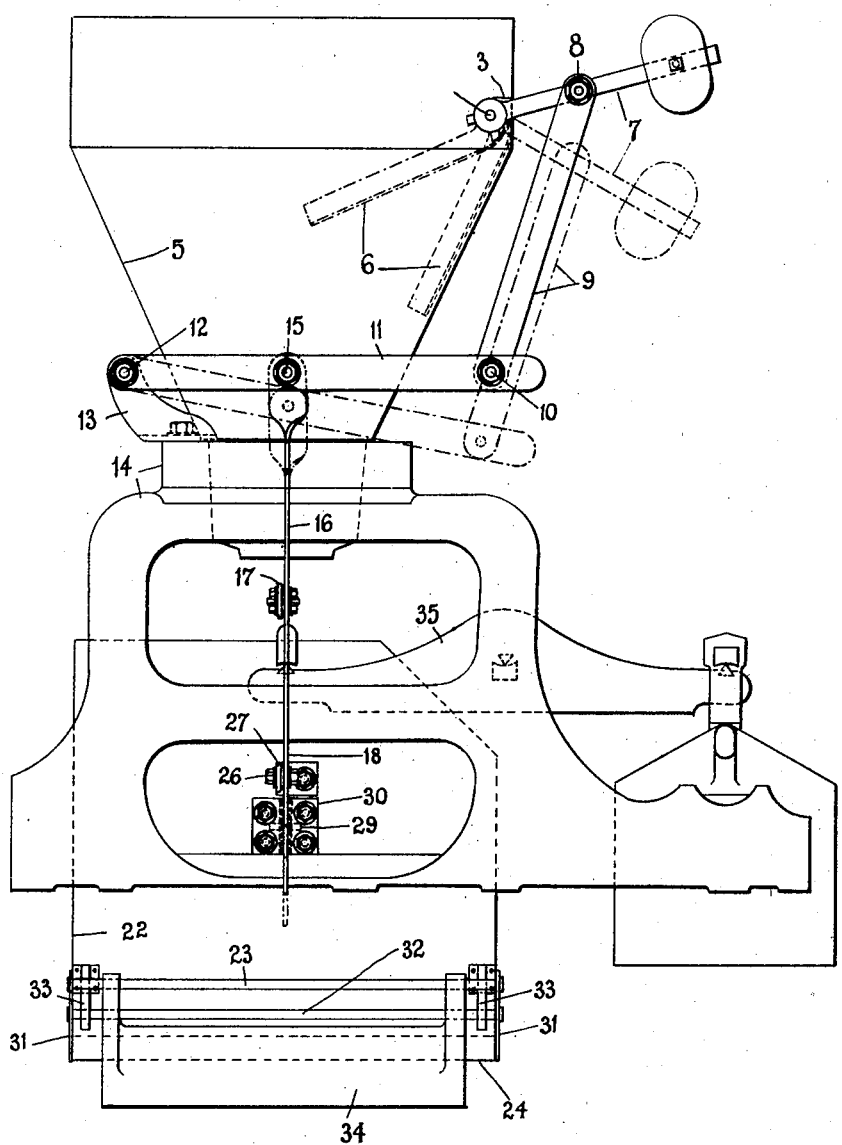
Figure 1 is a side elevation showing our invention applied to one kind of automatic weighing scale, together with so much of the scale, supply hopper and framework as is necessary to an understanding of the invention.

Pivotally mounted by means of the bracket 3 and shaft 4 within the supply hopper 5 is a plate 6 disposed against or adjacent to one side of the hopper, the plate 6 being maintained in the said position by the grain or the like within the hopper 5. When however the supply of grain falls below a predetermined minimum (the minimum generally being an amount slightly in excess of that required to complete a weighment) the plate 6 swings automatically into the supply hopper 5 upon its pivotal shaft 4 under the influence of a weighted arm 7 mounted on the shaft 4 external to the supply hopper 5. The said pivotally mounted plate 6 and its operation for the purpose stated is not novel. This pivotally mounted plate 6 is pivotally connected through arm 7 by a bolt 8 to a link 9 arranged external to the supply hopper 5, the lower end of the link 9 being pivotally connected by a bolt 10 to a lever 11 fulcrumed by means of a bolt 12 upon the bracket 13, secured to the frame 14 of the scale. The lever 11 is connected to the frame 14 of the scale. The lever 11 is connected by means of a bolt 15 to a vertical rod 16 which has vertical motion imparted thereto by the pivoting radial motion of the said plate 6. The rod 16 is connected by means of an arm 17 secured thereto to a vertical bar 18 which has a slot 19 in its upper end which is engaged by a pin 20 which forms a pin and slot connection between the arm 17 and the bar 18, the lower end of the bar being beveled as seen at 21. The said bar 18 is located adjacent to the side of the weigh hopper 22 of the scale and the lower end 21 of the bar 18 is approximate to the rear linkage 23 of the discharge door 24 of the weigh hopper 22. The lower end of the rod 16 is slotted at 25 the slot receiving the pin 26 mounted in the bracket 27 secured to the framework 14 of the scale. This pin and slot connection form a motion limiting and guiding means for the rod 16. The bar 18 near its lower end runs between guide rollers 28 which are rotatably mounted upon pins 29 mounted in the bracket 30 secured to the framework 14.

Figure 2:
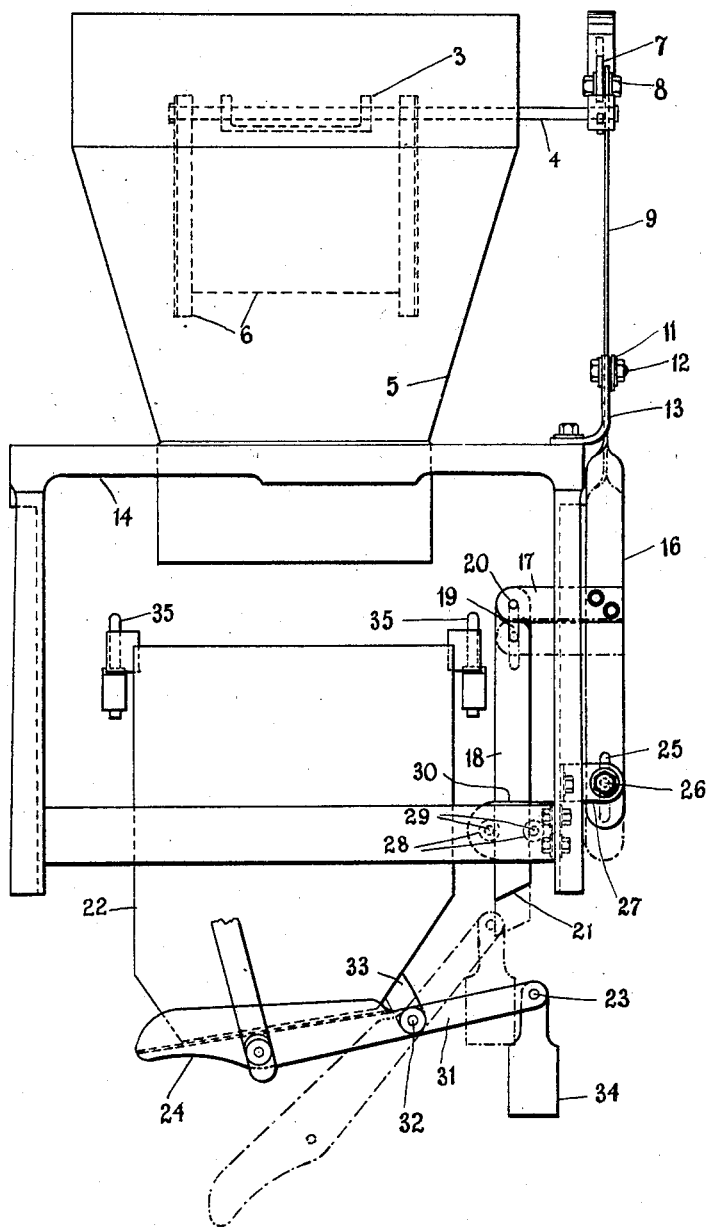
Fig. 2 is an end elevation viewed from the left hand side of Fig. 1.

When there is a sufficient amount of grain in the supply hopper 5 to permit of the continuing operation of the scale, the lower end 21 of the said bar 18 is held out of the path of motion of the rear linkage 23 of the said door 24 during its discharging operation (see the full line position Fig. 2) but when the supply of grain falls below the predetermined minimum the pivoted plate 6 in the supply hopper 5 automatically moves upwardly under the influence of the weighted arm 7 as described (see the dotted line position Fig. 1) and by so doing lowers the bar 18 through the arm 7, link 9, lever 11 and rod 16, and the lower end 21 of the bar 18 is now in the path of motion of the rear linkage 23 of the door 24 and maintains the door 24 in its open position (see the dotted line position in Fig. 2) upon the next discharging operation of the weigh hopper 22, and the door 24 is so maintained until the amount of grain in the supply hopper 5 has again become sufficient to permit of a continuing operation of the scale, when the pivoted plate 6 is pressed back by the grain to its position against or adjacent to the side of the supply hopper 5 thereby raising the bar 18 through the said connections and releasing the linkage 23 of the door 24 to permit of a restarting of the operation of the scale.

The linkage mechanism 23 of the weigh hopper door 24 is the ordinary mechanism comprising the side arms 31 secured to or formed integral with the door 24 and pivoting about the pin 32 in the brackets 33 secured to the weigh hopper 22. The round rod 23 has pivotally suspended therefrom the counterweight 34 which operates to close the door 24. It is the round rod 23 which makes contact with the bar 18 to lock or maintain the door 24 in the open position and the contact is made on or substantially on the vertical center line of the weigh hopper 22 whereby any swinging motion of the hopper about its knife-edge support on the scale beam 35 does not affect the making and maintaining of the contact between the rod 23 and the bar 18.

It will be obvious that the bar 18 could be pivotally connected direct to the weighted arm 7 without the interposition of the other connections herein described and that it would operate in a similar manner with reference to the linkage 23 of weigh hopper door 24.

Mechanism as herein described does not in any degree affect the accuracy or sensitiveness of the scale and is not in contact with the ordinary scale mechanism when the scale is in operation and does not necessitate additions to or alterations of the mechanism of the scale. Means may be provided for mechanically raising the said bar 18 to release the weigh hopper door 24 if it is desired to empty the supply hopper. The pin and slot connection 19 and 20 permit of the lifting of the bar 18 for this purpose and the said connection also permits of the opening of the hopper door even when the supply is *nil* or low and the bar 18 is in its lowest position. The beveled end 21 of the bar 18 facilitates the lifting motion of the bar by the rod 23 if the bar 18 is in its lowest position when the door 24 opens.

This invention may as mentioned be applied in a variety of ways and to various types of automatic scales of the kind referred to, and it is therefore not necessary to further describe the scale construction or mechanism or its means of operation as these form no part of the present invention. The addition of an attachment of the kind herein described prevents the escape of dust from the supply or weigh hoppers which would result if there was an insufficient supply of grain to complete a weighment, or should there be an irregular and slow feed of material to the hoppers from the elevator or elsewhere.

Claims:—

1. The combination with an automatic weighing scale of the kind herein referred to, of a supply hopper, a weigh hopper, a weigh hopper discharge door, and means whereby the amount of material in the supply hopper controls the operation of the weigh hopper discharge door, so that when the supply falls below a predetermined minimum the said discharge door is maintained in the open position and the normal operations of the scale are suspended until the supply of material has been increased whereupon the operations of the scales are automatically restarted.

2. The combination with an automatic weighing scale of the kind herein referred to, of a supply hopper, a plate pivotally mounted within said hopper and adapted to be positioned by the amount of material therein, a bar external to the supply hopper, a weigh hopper, a weigh hopper discharge door, linkage on said discharge door, connections between said bar and said plate, part of said bar being located in the path of the motion of the weight which closes the weigh hopper discharge door when the supply of material is below a predetermined minimum and removed from said path when the supply is above the said minimum.

3. Mechanism for controlling the operations of automatic weighing scales of the kind herein referred to, comprising a supply hopper, a member pivotally mounted within the supply hopper and having its position determined by the amount of material within said supply hopper, a bar connected to said member, a weigh hopper, a weigh hopper discharge door, linkage on said discharge door, said bar being automatically positioned in the path of motion of the weight which closes the weigh hopper discharge door when the supply of material within the supply hopper falls below a predetermined minimum and removed from said path when the supply is above said minimum.

4. Mechanism for use in combination with automatic weighing scales of the kind herein referred to, comprising a supply hopper, a pivotally mounted plate, within said supply hopper, a weighted arm connected thereto, a link connected to said arm, a lever pivoted to said link, a guided rod pivotally connected to said lever, a bar having connection to said rod, a weigh hopper and a weigh hopper discharge door, the closing of the discharge door being prevented when the supply of material in the supply hopper falls below a given amount.

In testimony whereof I have signed my name to this specification in the presence of two subscribing witnesses.

ARTHUR BARRACLOUGH.

Witnesses:
 GEORGE E. FOLKES,
 N. H. BROOKS.